United States Patent
Akaki et al.

(10) Patent No.: US 7,468,001 B2
(45) Date of Patent: Dec. 23, 2008

(54) HIGH-SPEED FORMING TAP

(75) Inventors: Sadayuki Akaki, Tokyo (JP); Masao Mitsui, Tokyo (JP); Willard E. Henderer, Evans, GA (US)

(73) Assignees: Yamawa Mfg. Co., Ltd., Tokyo (JP); Kennametal Inc., Latrobe, PA (US)

( * ) Notice: Subject to any disclaimer, the term of this patent is extended or adjusted under 35 U.S.C. 154(b) by 121 days.

(21) Appl. No.: 10/549,452

(22) PCT Filed: Mar. 2, 2004

(86) PCT No.: PCT/JP2004/002543
§ 371 (c)(1),
(2), (4) Date: Jan. 26, 2006

(87) PCT Pub. No.: WO2004/080637
PCT Pub. Date: Sep. 23, 2004

(65) Prior Publication Data
US 2006/0127193 A1    Jun. 15, 2006

(30) Foreign Application Priority Data
Mar. 14, 2003 (JP) ............. 2003-070488

(51) Int. Cl.
*B21H 3/02* (2006.01)
(52) U.S. Cl. ........................ 470/198; 408/220
(58) Field of Classification Search ............ 420/198, 420/199; 408/215, 220, 222; 76/108.1, 108.6; 72/71
See application file for complete search history.

(56) References Cited

U.S. PATENT DOCUMENTS

| | | | |
|---|---|---|---|
| 1,447,700 A | 3/1923 | Wells | |
| 2,816,302 A * | 12/1957 | Bauer | 72/71 |
| 3,336,614 A | 8/1967 | Benjamin | |
| 4,462,727 A * | 7/1984 | Marburger | 408/220 |
| 5,127,776 A * | 7/1992 | Glimpel | 408/220 |
| 5,222,847 A * | 6/1993 | Hiyama et al. | 408/222 |
| 5,318,393 A * | 6/1994 | Yamada | 408/222 |
| 5,487,626 A * | 1/1996 | Von Holst et al. | 408/144 |
| 6,035,744 A * | 3/2000 | Maier | 76/117 |
| 6,918,718 B2 * | 7/2005 | Schwarz | 408/222 |
| 7,147,413 B2 * | 12/2006 | Henderer et al. | 408/144 |
| 2006/0216124 A1 | 9/2006 | Oknestam et al. | |

FOREIGN PATENT DOCUMENTS

GB    365219    1/1932

(Continued)

*Primary Examiner*—Edward Tolan
(74) *Attorney, Agent, or Firm*—Oliff & Berridge, PLC

(57) ABSTRACT

A high-speed forming tap (1) for cutting and forming a female screw by cutting edges (E) of a screw portion (2) fed in synchronous with the rotation of a machine tool. The high-speed forming tap is characterized in that chamfers (CF) are provided at a bevel lead (2a) of the screw part (2). The chamfers (CF) start from the cutting edge (E) and are provided along ridgelines (R) between a crest face (2e) and flanks, or a following flank (2c) and a leading flank (2d). This structure enables the shape of the edges of the tap leading portion to be stably maintained and high-speed, smooth female screw cutting with high accuracy, and provides a tap with long life.

13 Claims, 7 Drawing Sheets

FOREIGN PATENT DOCUMENTS

| | | |
|---|---|---|
| JP | A-49-26874 | 3/1974 |
| JP | U-57-189735 | 5/1982 |
| JP | U-60-67821 | 5/1985 |
| JP | A-63-200916 | 8/1988 |
| JP | U-63-124426 | 8/1988 |
| JP | U-3005740 | 10/1994 |
| JP | A 11-221716 | 8/1999 |
| WO | WO 02/087813 A1 | 11/2002 |

* cited by examiner

HIGH-SPEED FORMING TAP

TECHNICAL FIELD

The present invention relates to a high-speed forming tap for cutting and forming a female screw by a cutting edge of a screw part.

BACKGROUND ART

As functions of a screw, there are a "fastening function" of fastening an object and a "feed function" of feeding an object. Both of the functions achieve maximum effects if both flanks of a male screw M and a female screw F come into face contact with each other, as shown in FIG. 5(a). Meanwhile, there is a tolerance in sizes of an actual male screw and an actual female screw. Moreover, there is also a tolerance in sizes of tools and machine tools for forming those screws. Thus, both flanks of the screws are very unlikely to come into face contact with each other. Even in screws fitted nicely into each other, technically speaking, as shown in FIG. 5(b), the both flanks of the male and female screws M and F only come into point contact with each other in spots indicated by the symbols P in FIG. 5(b). A strong axial stress acting in fastening merely causes a state close to surface contact due to elastic deformation of a screw material. Therefore, mostly, as shown in FIG. 5(c), the male and female screws are loosely fitted into each other.

However, the point contact state and the state where the screws are loosely fitted into each other as described above are far from good as machine parts. Thus, the inventors of the present application have investigated the causes of the point contact state and the state where the screws are loosely fitted into each other. As a result, it has been found out that there are three main causes, including inaccuracy of feeding a tap, a loss of shape in a tap cutting edge, and run-out of the tap in cutting. As to feeding of the tap, a recent high-precision machine tool such as a NC machine tool enables accurate feeding by feeding forward the tap by the machine tool in synchronization with rotation. Thus, it has been found out that, if the problems of the loss of shape in the tap cutting edge and the run-out of the tap in cutting are resolved, it is possible to realize a tap capable of performing highly accurate female screw forming so as to achieve a surface contact for a long period of time.

Meanwhile, as to a shape of a bevel lead 2a of a screw part 2 in a conventional tap 1 as shown in FIG. 6, the portion B of the bevel lead 2a in FIG. 6 will be shown in closeup in FIGS. 7(a) and 7(b). First, a shape of a male screw having a crest face 2e lower than a complete thread is formed. At the same time, as shown in FIG. 7(a), a cutting face 4a is formed by a flute 4. Next, as shown in FIG. 7(b), honing is performed along a cutting edge E that is a nodal line between the cutting face 4a, a following flank 2c of the thread, a leading flank 2d thereof (not shown in FIGS. 7(a) and 7(b)) and the crest face 2e, and along a ridgeline R between the following flank 2c and the leading flank 2d of the thread and the crest face 2e. Accordingly, the bevel lead 2a has its whole shape slightly rounded, including the cutting edge E and the ridgeline R.

Therefore, in the conventional tap 1, at the time of cutting and forming a female screw, a very large cutting load is applied to a cutting edge corner part where the cutting edge E and the ridgeline R intersect with each other. Accordingly, a temperature of the cutting edge corner part is increased, and a female screw material is likely to be welded thereto. Thus, a built-up edge is repeatedly attached and detached in the corner part. As a result, wear and fracture and thus a loss of shape in the cutting edge occur. In order to prevent the above problems, a surface of the screw part is often coated with a hard layer which is highly resistant to welding. However, there is a problem that even the hard layer wears and fractures.

Consequently, it is an object of the present invention to provide a tap capable of smoothly performing highly accurate female screw forming at high speed by resolving the problems of the loss of shape in the tap cutting edge and the waggling of the tap in cutting.

DISCLOSURE OF INVENTION

A high-speed forming tap of the present invention, which favorably solves the foregoing problems, is a tap which is fed forward by a machine tool in synchronization with rotation to cut and form a female screw by a cutting edge of a screw part. According to the high-speed forming tap, a bevel lead of the screw part has chamfers from the cutting edge along ridgelines between a crest face and a following flank of a thread, and between the crest face and a leading flank of the thread.

In the high-speed forming tap, the chamfer provided in the bevel lead of the screw part along the ridgeline between the following flank and the leading flank of the thread and the crest face from the cutting edge reduces a cutting load applied to a cutting edge corner part where the cutting edge and the ridgeline intersect with each other and prevents occurrence of a built-up edge therein. In addition, a portion of the ridgeline in a straight part of a complete thread part which follows the bevel lead of the screw part or in a back tapered part of the complete thread part which follows the bevel lead of the screw part if the straight part is removed chips off a left corner portion of the chamfer along the ridgeline of the bevel lead. Note that the chamfer may be provided up to the ridgeline in a beginning portion of the straight part or the back tapered part, which follows the bevel lead.

Therefore, according to the high-speed forming tap of the present invention, wear and fracture of the cutting edge corner part and thus a loss of shape in the cutting edge can be suppressed by reducing the load applied to the cutting edge corner part and preventing occurrence of the built-up edge therein. Thus, a stable cutting edge shape of the bevel lead of the tap can be maintained, and highly accurate female screw forming can be smoothly performed at high speed. Moreover, a long-lived tap can be realized.

Note that, in the high-speed forming tap of the present invention, it is preferable that a concentricity of the screw part is set to a tolerance of IT8 or less at a tip face of the bevel lead of the screw part by using a shank as a reference. Moreover, it is preferable that run-out of the screw part is set to ½ of the tolerance of IT8 or less at the cutting edge in the center of the bevel lead of the screw part by using the center of both ends of the tap as a reference. According to the configuration described above, unlike the conventional tap in which the concentricity is set within the tolerance by using only a center reference, run-out of the tap in cutting can be suppressed by using a chuck of the machine tool and the like to hold the shank. Thus, highly accurate female screw forming can be more smoothly performed at higher speed. Moreover, a longer-lived tap can be realized.

Moreover, in the high-speed forming tap of the present invention, it is preferable that a peripheral face of the shank has a cylindrical shape having a fixed major diameter up to a rear end thereof as in the case of a straight shank of a drill. According to the configuration described above, unlike the conventional tap having a square part in the rear end of the shank, a circularity of the shank and concentricity thereof with the screw part in forming the shank can be more enhanced. Moreover, a length of a holding part can be increased within a limited overall length of the shank. Thus, the run-out of the tap in cutting can be more reduced by using the chuck of the machine tool and the like to hold the shank.

In the high-speed forming tap of the present invention, it is preferable that at least the screw part is made of high-speed tool steel or cemented carbide. In addition, at least the screw part is coated with a hard layer. According to the configuration described above, tap life can be more extended.

BEST MODE FOR CARRYING OUT THE INVENTION

Figure 1A:
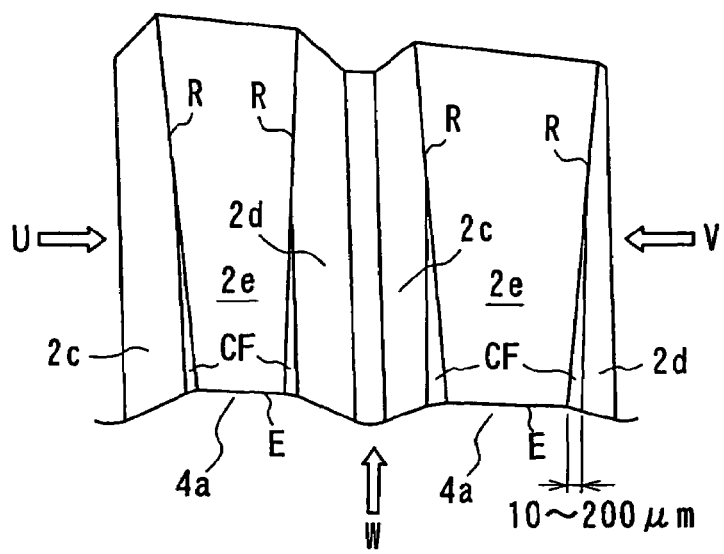
FIG. 1(a) is a side view showing a portion A in FIG. 2(a) in closeup along a flute.
Figure 1B:
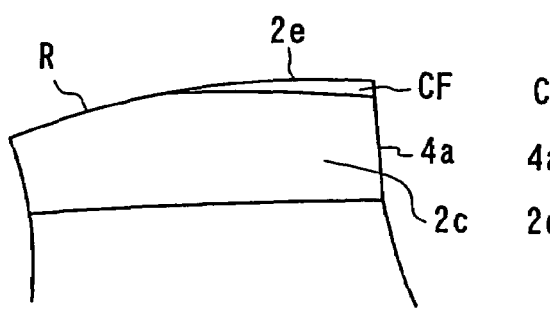
FIGS. 1(b) to 1(d) are side views seen from directions indicated by arrows U, V and W in FIG. 1(a), respectively.
Figure 1C:
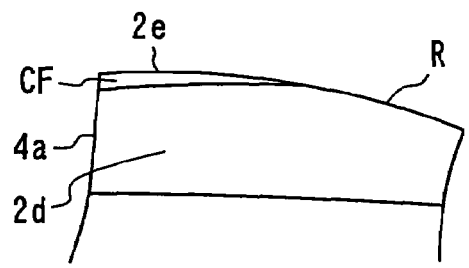
Figure 1D:
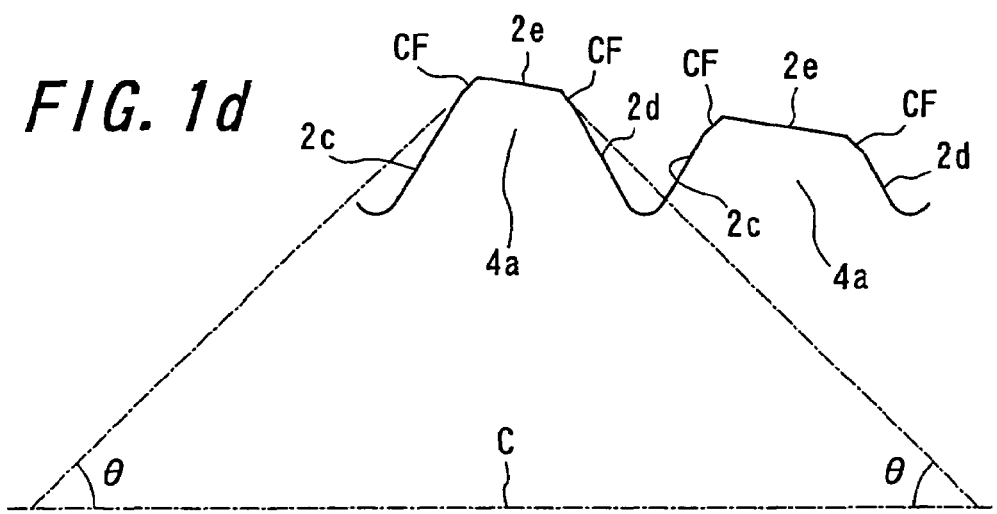
Figure 2A:
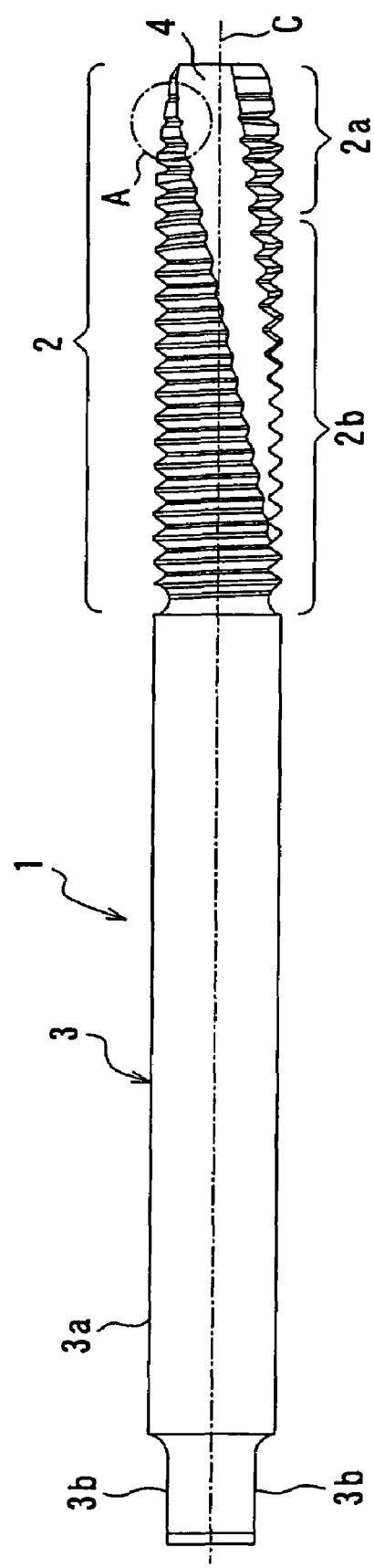
FIG. 2(a) is a side view and FIG. 2(b) is an end view showing an embodiment of a high-speed forming tap of the present invention.
Figure 2B:
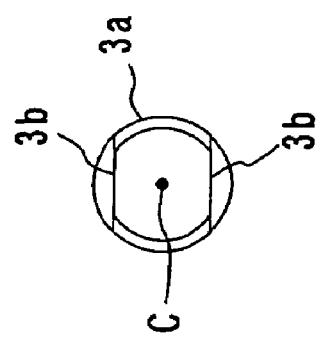
Figure 3A:
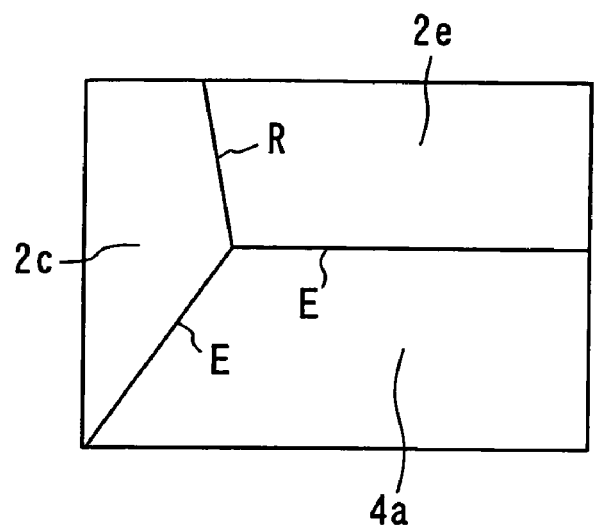
FIGS. 3(a) to 3(c) are explanatory views showing procedures of forming a chamfer along a ridgeline of the tap of the embodiment.
Figure 3B:
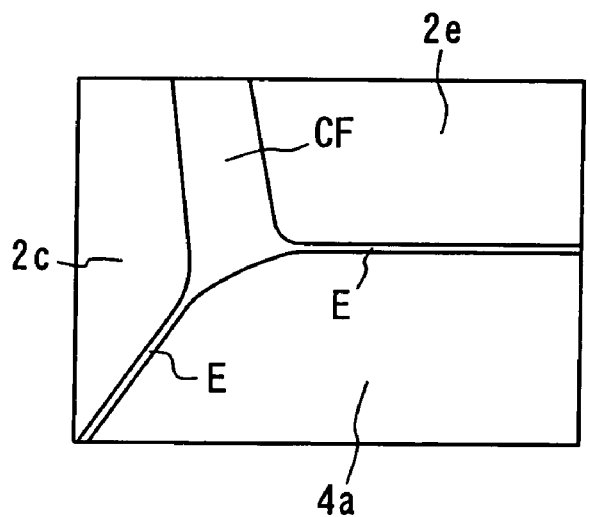
Figure 3C:
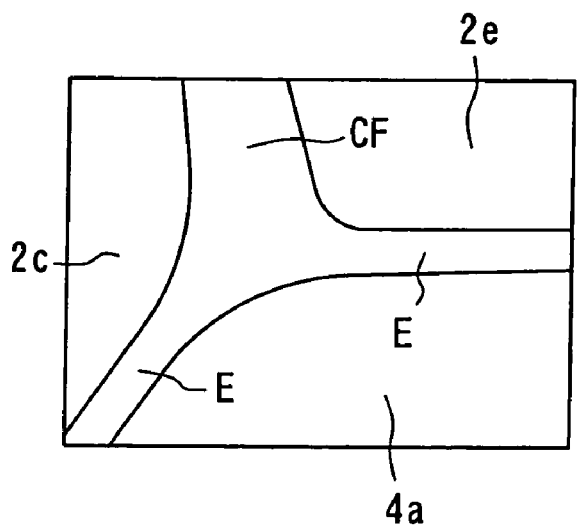

With reference to the drawings, an embodiment of the present invention will be described in detail below. Here, FIG. 1(a) is a side view showing, in closeup along a flute, a portion A of an embodiment of a high-speed forming tap of the present invention, of which side view and end view are shown in FIGS. 2(a) and 2(b). In addition, FIGS. 1(b) to 1(d) are side views seen from directions indicated by arrows U, V and W in FIG. 1(a), respectively. FIGS. 3(a) to 3(c) are explanatory views showing procedures of forming a chamfer along a ridgeline of the tap of the embodiment. In the drawings, the same parts as those of the conventional example will be denoted by the same reference numerals.

Specifically, a high-speed forming tap 1 of this embodiment, as shown in FIG. 1, integrally includes a screw part 2 of a right-hand screw and a shank 3 connected thereto. The high-speed forming tap 1 is fed forward by a machine tool in synchronization with rotation to cut and form a female screw by a cutting edge of the screw part 2. A bevel lead 2a positioned at a tip portion of the screw part 2, as shown in closeup in FIGS. 3(a) to 3(c), first, a shape of a male screw having a crest face 2e lower than a complete thread is formed. At the same time, as shown in FIG. 3(a), a cutting face 4a is formed of a plurality of (for example, 3) left-hand flutes 4. Next, as shown in FIG. 3(b), a chamfer (for example, a chamfer formed of a face forming a part of a circular conical surface having a central axis line C of the tap 1 as its central axis line) CF which forms a tilt angle θ (about 45 degrees in the example shown in FIG. 1(d)) with the central axis line C is formed, for example, by grinding along a ridgeline R between a following flank 2c and a leading flank 2d (not shown in FIGS. 3(a) to 3(c)) of the thread and the crest face 2e from a cutting edge E that is a nodal line between the cutting face 4a, the following flank 2c and the leading flank 2d of the thread and the crest face 2e. Thereafter, as shown in FIG. 3(c), honing is performed along the chamfer CF, the ridgeline R and the cutting edge E. Accordingly, the bevel lead 2a has its whole shape slightly rounded, including the cutting edge E, both edges of the chamfer CF and the ridgeline R.

Moreover, in the high-speed forming tap 1 of the embodiment, concentricity of the screw part 2 is set to a tolerance of IT8 or less (JIS B 0401-1) at a position of a tip face of the bevel lead 2a of the screw part 2 by using the shank 3 as a reference. Moreover, run-out of the screw part 2 is set to ½ of the tolerance of IT8 or less at a position of the cutting edge E in the center of the bevel lead 2a of the screw part 2 by using the center of both ends of the tap as a reference. Furthermore, in order to enhance rigidity of the shank 3, a major diameter of the shank 3 is set to be approximately as large as the screw part 2 even when one having a nominal diameter of M8 or more is used.

In a rear end of the high-speed forming tap 1 of the embodiment, the end following a holding part 3a of the shank 3, a parallel plane 3b used when the tap 1 is manufactured is provided.

Moreover, the high-speed forming tap 1 of the embodiment is entirely made of high-speed tool steel (high speed steel) or cemented carbide. In addition, the screw part 2 thereof is coated with a hard layer such as titanium, which is formed by PVD (physical vapor deposition), for example.

Furthermore, the high-speed forming tap 1 of the embodiment is fed forward by the machine tool in synchronization with rotation. Thus, a straight part for guiding the feeding is eliminated from a complete thread part 2b which follows the bevel lead 2a of the screw part 2. Accordingly, the entire complete thread part 2b is formed to be a back tapered part which is narrowed toward the shank 3.

In the high-speed forming tap 1 of the embodiment, the bevel lead 2a of the screw part 2 has the chamfer CF provided along the ridgeline R between the following flank 2c and the leading flank 2d of the thread and the crest face 2e from the cutting edge E. The chamfer CF reduces a load applied to a cutting edge corner part where the cutting edge E and the ridgeline R intersect with each other and prevents occurrence of a built-up edge therein. In addition, a portion of the ridgeline R in the complete thread part 2b which follows the bevel lead 2a of the screw part 2 chips off a left corner portion of the chamfer CF along the ridgeline R of the bevel lead 2a.

Therefore, according to the high-speed forming tap 1 of the embodiment, wear and fracture of the cutting edge corner part and thus a loss of shape in the cutting edge can be suppressed by reducing a cutting load to be applied to the cutting edge corner part and preventing occurrence of the built-up edge therein. Thus, a stable cutting edge shape of the bevel lead 2a of the tap can be maintained, and highly accurate female screw forming can be smoothly performed at high speed. Moreover, a long-lived tap can be realized.

Moreover, according to the high-speed forming tap 1 of the embodiment, the concentricity of the screw part 2 is set to the tolerance of IT8 or less at the tip face of the bevel lead 2a of the screw part 2 by using the shank 3 as a reference. Moreover, the run-out of the screw part 2 is set to ½ of the tolerance of IT8 or less at the cutting edge E in the center of the bevel lead 2a of the screw part 2 by using the center of both ends of the tap as a reference. Thus, unlike the conventional tap in which the concentricity is set within the tolerance by using only a center reference, run-out of the tap 1 in cutting can be suppressed by using a chuck of the machine tool and the like to hold the shank 3. Consequently, in combination with a point that rigidity of the shank 3 is enhanced, highly accurate female screw forming can be more smoothly performed at higher speed. Moreover, a longer-lived tap can be realized.

According to the high-speed forming tap 1 of the embodiment, the entire tap is made of high speed tool steel or cemented carbide. In addition, the screw part thereof is coated with a hard layer. Thus, tap life can be more extended.

Figure 4A:
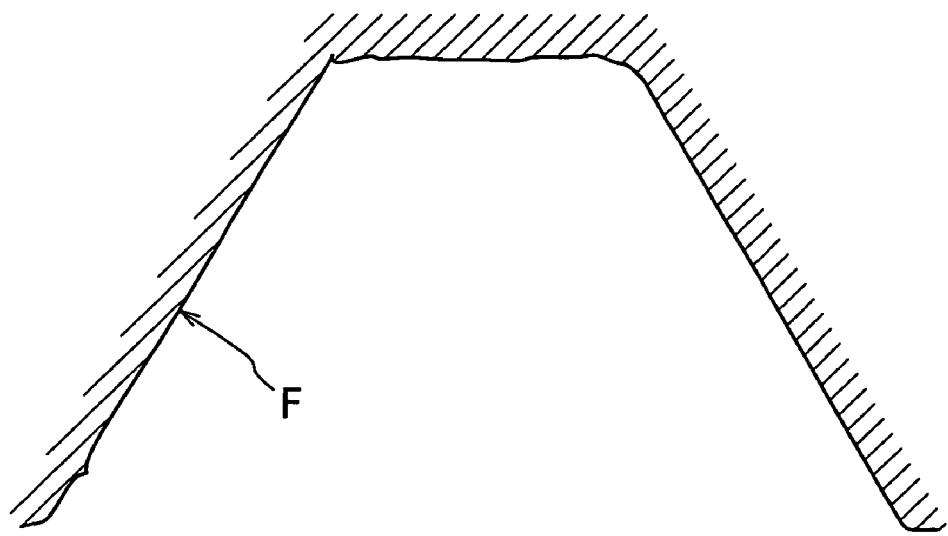
FIGS. 4(a) and 4(b) are cross-sectional views showing cross-sectional shapes of first and thousandth holes in a male screw formed by the high-speed forming tap 1 of the embodiment.
Figure 4B:
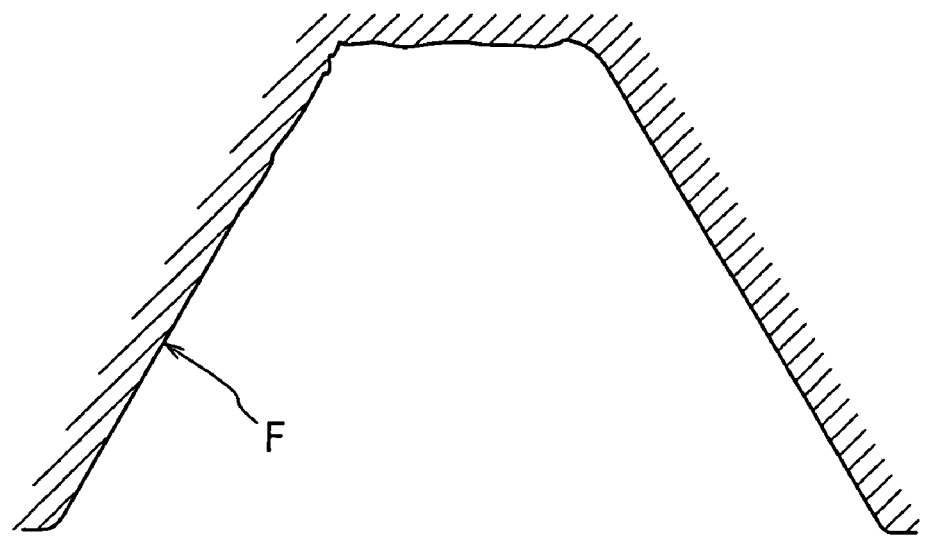
Figure 5A:
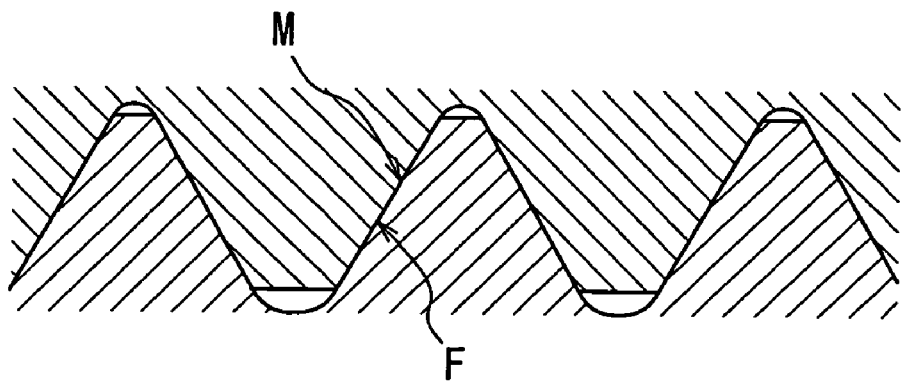
FIGS. 5(a) to 5(c) are explanatory views showing states where screws are fitted into each other, the screws being formed in three different ways.
Figure 5B:
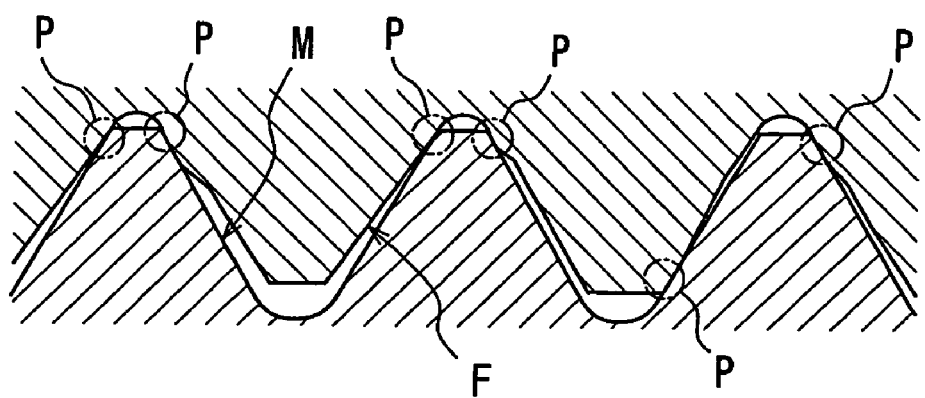
Figure 5C:
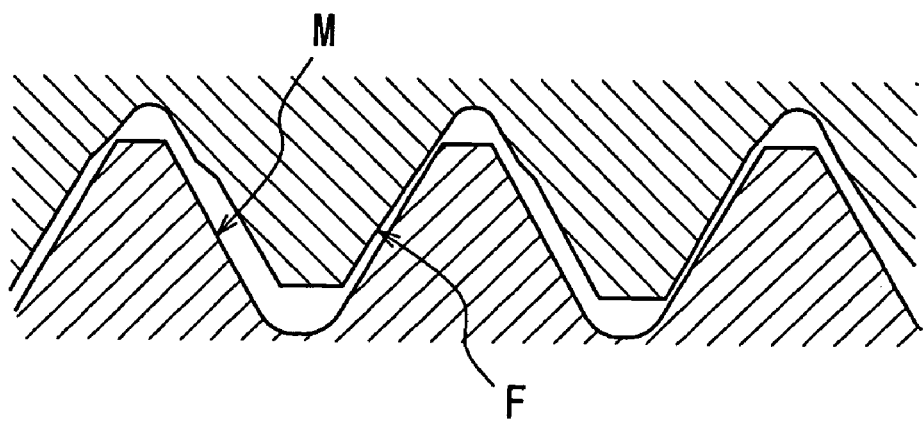
Figure 6:
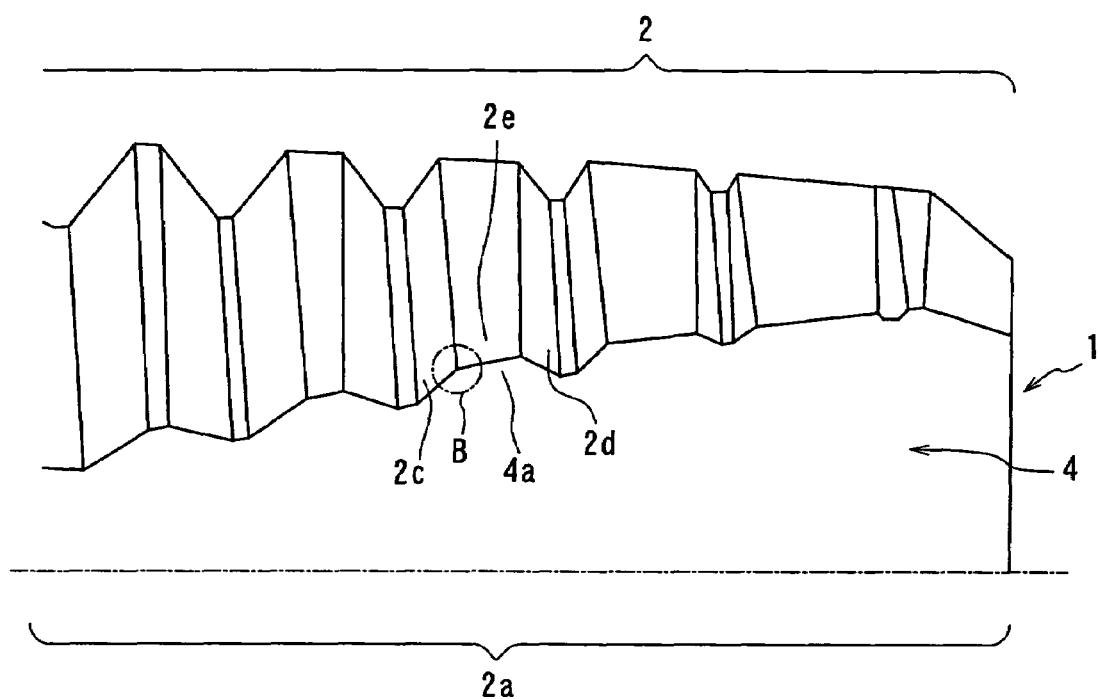
FIG. 6 is a side view showing a bevel lead of a conventional tap.
Figure 7A:
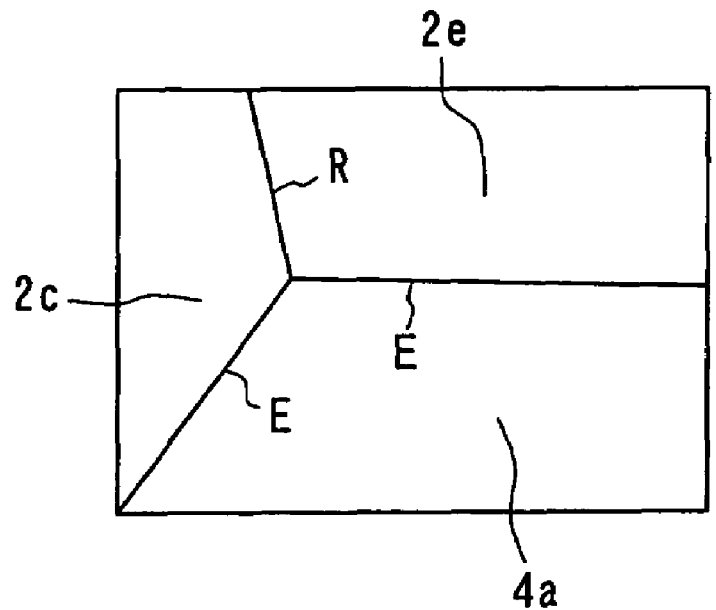
FIGS. 7(a) and 7(b) are explanatory views showing procedures of forming of a cutting edge and a ridgeline of the conventional tap.
Figure 7B:
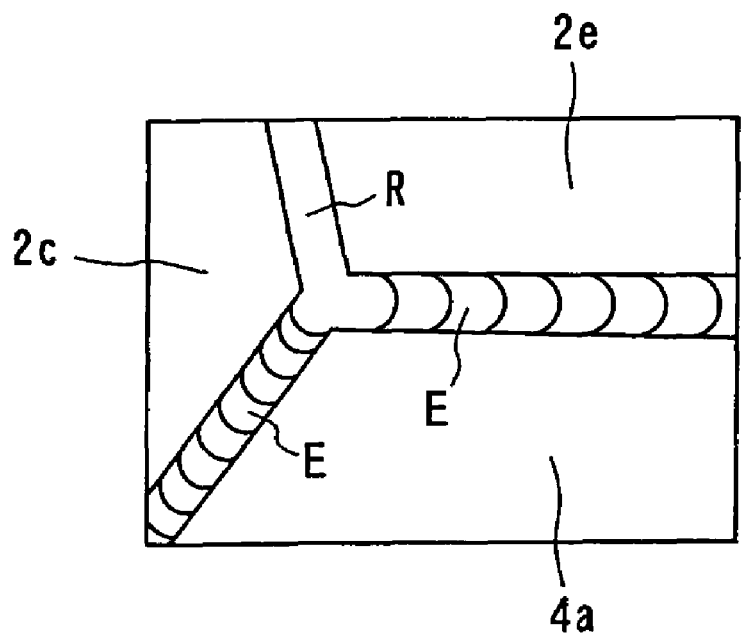

Note that FIG. 4(a) shows a cross-sectional shape of a first hole of a female screw F which is formed by the high-speed forming tap 1 of the embodiment, and FIG. 4(b) shows a cross-sectional shape of a thousandth hole of the female screw F which is formed by the same high-speed forming tap 1 of the embodiment. As is clear from the drawings, according to the high-speed forming tap 1 of the embodiment, there is hardly any change throughout the first to thousandth holes. Moreover, it is found out that highly accurate female screw forming to obtain both smooth flank faces can be carried out.

Although the present invention has been described above based on the example shown in the drawings, the present invention is not limited to the example described above. For example, the tap shown in the drawings is a spiral tap including a right-hand screw and left-hand flutes. However, the present invention can also be applied to a spiral tap including a right-hand screw and right-hand flutes, a straight fluted tap including straight flutes, a spiral pointed tap, a tap including a left-hand screw and similar flutes, and the like. Moreover, although the shank shown in the drawings is a straight shank, a taper shank may be used in the tap of the present invention.

Furthermore, the shank shown in the drawings has the parallel plane in the rear end. However, in the tap of the present invention, up to the rear end of the shank may be set as the holding part by forming a peripheral face of the shank to have a cylindrical shape having a fixed major diameter up to the rear end of the shank as in the case of a straight shank of a drill. In addition, the tap of the present invention does not have to be coated with a hard layer. Moreover, in the tap of the present invention, the flank and the crest face in the bevel lead may be appropriately relieved.

INDUSTRIAL APPLICABILITY

According to the high-speed forming tap of the present invention, wear and fracture of the cutting edge corner part and thus a loss of shape in the cutting edge can be suppressed by reducing a load to be applied to the cutting edge corner part and preventing occurrence of the built-up edge therein. Thus, a stable cutting edge shape of the bevel lead of the tap can be maintained, and highly accurate female screw forming can be smoothly performed at high speed. Moreover, a long-lived tap can be realized.

The invention claimed is:

1. A high-speed forming tap which is fed forward by a machine tool in synchronization with rotation to cut and form a female screw by a cutting edge of a screw part,
   wherein the screw part includes a bevel lead having chamfers provided from the cutting edge along ridgelines between a crest face and a following flank of a thread, and between the crest face and a leading flank of the thread, a width of each of the chamfers decreases with distance from the cutting edge.

2. The high-speed forming tap according to claim 1, wherein concentricity of the screw part is set to a tolerance of not more than IT8 at a tip face of the bevel lead of the screw part by using a shank as a reference, and run-out of the screw part is set to ½ of the tolerance of not more than IT8 at the cutting edge in the center of the bevel lead of the screw part by using the center of both ends of the tap as a reference.

3. The high-speed forming tap according to claim 1, wherein a peripheral face of the shank has a cylindrical shape having a fixed major diameter up to a rear end thereof.

4. The high-speed forming tap according to claim 1, wherein at least the screw part is made of any of high-speed tool steel and cemented carbide.

5. The high-speed forming tap according to claim 1, wherein at least the screw part is coated with a hard layer.

6. The high-speed forming tap according to claim 2, wherein a peripheral face of the shank has a cylindrical shape having a fixed major diameter up to a rear end thereof.

7. The high-speed forming tap according to claim 2, wherein at least the screw part is made of any of high-speed tool steel and cemented carbide.

8. The high-speed forming tap according to claim 3, wherein at least the screw part is made of any of high-speed tool steel and cemented carbide.

9. The high-speed forming tap according to claim 2, wherein at least the screw part is coated with a hard layer.

10. The high-speed forming tap according to claim 3, wherein at least the screw part is coated with a hard layer.

11. The high-speed forming tap according to claim 4, wherein at least the screw part is coated with a hard layer.

12. The high-speed forming tap according to claim 6, wherein at least the screw part is made of any of high-speed tool steel and cemented carbide.

13. The high-speed forming tap according to claim 6, wherein at least the screw part is coated with a hard layer.

* * * * *